United States Patent
Bremser et al.

(10) Patent No.: US 6,716,905 B1
(45) Date of Patent: Apr. 6, 2004

(54) COATING AGENT

(75) Inventors: Wolfgang Bremser, Muenster (DE); Frank Strickmann, Steinfurt (DE); Maximilian Bendix, Oelde (DE); Wolfgang Paulus, Ober-Olm (DE); Roman Benedikt Raether, Limburgerhof (DE); David Christie, Mannheim (DE)

(73) Assignees: Coatings AG, Muenster (DE); BASF Aktiengesellschaft, Ludwigshafen (DE)

(*) Notice: Subject to any disclaimer, the term of this patent is extended or adjusted under 35 U.S.C. 154(b) by 0 days.

(21) Appl. No.: 09/868,769

(22) PCT Filed: Dec. 22, 1999

(86) PCT No.: PCT/EP99/10335

§ 371 (c)(1), (2), (4) Date: Jun. 21, 2001

(87) PCT Pub. No.: WO00/39169

PCT Pub. Date: Jul. 6, 2000

(30) Foreign Application Priority Data

Dec. 23, 1998 (DE) .......... 198 60 011
Mar. 5, 1999 (DE) .......... 199 09 752

(51) Int. Cl.$^7$ ............. C08K 3/20
(52) U.S. Cl. ......... 524/458; 524/500; 524/543; 524/555; 524/558; 524/549; 524/557; 524/515; 524/502; 524/524; 524/522
(58) Field of Search .......... 524/500, 543, 524/555, 558, 549, 557, 515, 502, 524, 522, 458

(56) References Cited

U.S. PATENT DOCUMENTS

| | | | |
|---|---|---|---|
| 4,656,226 A | 4/1987 | Hutchins et al. | 525/93 |
| 5,395,903 A | 3/1995 | Charmot et al. | 526/220 |
| 6,235,857 B1 | 5/2001 | Rizzardo et al. | 526/220 |

FOREIGN PATENT DOCUMENTS

| | | |
|---|---|---|
| CA | 2280516 | 8/1998 |
| EP | 218 436 | 4/1987 |
| EP | 0 597 747 | 5/1994 |
| EP | 732359 A1 * | 9/1996 |
| EP | 732 359 | 9/1996 |
| JP | 08003208 A * | 1/1996 |
| WO | WO 92/13903 | 8/1992 |
| WO | WO 93/22351 | 11/1993 |
| WO | WO 93/22355 | 11/1993 |
| WO | WO 96/15157 | 5/1996 |
| WO | WO 97/13792 | 4/1997 |
| WO | WO 98/01478 | 1/1998 |
| WO | WO 98/37104 | 8/1998 |

* cited by examiner

Primary Examiner—David W. Wu
Assistant Examiner—William Cheung
(74) Attorney, Agent, or Firm—Keil & Weinkauf

(57) ABSTRACT

The invention relates to a coating agent, containing at least one conversion product (A) and at least one suitable additive (C), (A) being produced according to a method comprising the following step (i): (iv) reacting a reaction mixture comprising at least one radically convertible monomer in radical conditions, (a) in the presence of at least one radical initiator and a compound (I) of formula (II) wherein $R_1$ to $R_4$ each represent, independently of each other, hydrogen, an unsubstituted or substituted alkyl radical, cycloalkyl radical or aralkyl radical or an unsubstituted or a substituted aromatic hydrocarbon radical, on the condition that at least two of $R_1$ to $R_4$ represent an unsubstituted or a substituted aromatic hydrocarbon radical, in an aqueous phase

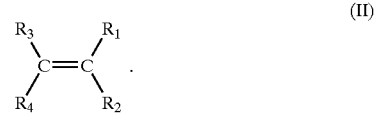

(II)

20 Claims, No Drawings

COATING AGENT

The present invention relates to a coating composition comprising at least one reaction product (A) prepared by a process comprising reacting under free-radical conditions at least one free-radically reactable monomer (a) in the presence of at least one free-radical initiator and of a compound (I) as defined below in aqueous phase, to coating compositions comprising at least one polymer (B) as defined herein, and to coating compositions comprising if desired (A) and/or (B) as a dispersion.

WO 98/01478 describes a process for preparing polymers in which the monomer to be reacted, which is selected in particular from vinyl monomers and acid derivatives having unsaturated groups, such as anhydrides, esters and imides of (meth)acrylic acid, for example, is reacted in the presence of a free-radical initiator and a thiocarbonylthio compound as chain transfer agent.

WO 92/13903 describes a process for preparing polymers having a low molecular weight by free-radical chain polymerization of one or more monomers in the presence of a group transfer agent, as defined therein, which has a C—S double bond. On the evidence of that document the compounds described therein having a C—S double bond act not only as chain transfer agents but also as growth regulators, so that in accordance with that document it is only possible to prepare polymers of low molecular weight in the presence of this compound.

A process for free-radical chain polymerization of unsaturated monomers in aqueous medium and in the presence of a macromonomer having a —CH$_2$—C(X)=CH$_2$ end group is defined in WO 93/22351, which also defines X. On the evidence of the examples of that application, various (meth) acrylates or (meth)acrylic acid and, if desired, monomers such as styrene are reacted in each case under emulsion or suspension polymerization conditions.

WO 93/22355 relates to a process for preparing crosslinkable polymers using a macromonomer as described in WO 93/22351.

WO 96/15157 likewise describes a process for preparing polymers having a comparatively narrow molecular weight distribution, in which a vinyl monomer, as defined therein, is reacted with a likewise vinyl-terminated macromonomer in the presence of a free-radical initiator.

Furthermore, WO 98/37104 relates to the preparation of polymers of controlled molecular weight, including acrylate-based polymers, by free-radical polymerization of corresponding monomers using a chain transfer agent which is defined more closely therein and has a C—C double bond and radicals which activate that double bond in terms of the free-radical addition reaction of monomers.

A free-radical chain polymerization or copolymerization with an ω-unsaturated oligo(methyl methacrylate) with ethyl acrylate, styrene, methyl methacrylate, acrylonitrile and vinyl acetate as comonomers is described in a scientific article in J. Macromol. Sci.-Chem., A 23(7), 839–852 (1986).

These documents do not mention using the products compositions described therein as coating ingredients.

The above-described polymer structures are of great interest for coating compositions, since such polymers enable the properties of the coating compositions to be set in a specific manner.

It is an object of the present invention to provide coating composition constituents which comprise chemically structured polymers which can be prepared by simple polymerization techniques. The polymers of the invention should in particular exhibit great variability in terms of the chemical composition and molecular weight.

We have found that these and other objects are surprisingly achieved by the coating composition of the invention comprising at least one reaction product (A), obtainable by a process comprising the following stage (i):

(i) reacting under free-radical conditions a reaction mixture comprising at least one free-radically reactable monomer (a) in the presence of at least one free-radical initiator and of a compound (I) of the formula

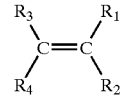

in which $R_1$ to $R_4$ each independently of one another are hydrogen, a substituted or unsubstituted alkyl radical, cycloalkyl radical or aralkyl radical, or an unsubstituted or a substituted aromatic hydrocarbon radical, with the proviso that at least two of $R_1$ to $R_4$ are an unsubstituted or a substituted aromatic hydrocarbon radical in aqueous phase, and at least one additive (C).

To prepare the abovementioned reaction product it is possible to use all free-radically reactable monomers as monomer (a). As monomer (a) it is preferred to use those free-radically homopolymerizable or copolymerizable compounds which include a hydrophilic group, such as, for example, a carboxyl group. With further preference, the monomers (a) comprise hydrophilic, free-radically homopolymerizable or copolymerizable monomers, i.e., monomers whose solubility in water is greater than that of styrene. It is of course also possible for mixtures of different hydrophilic monomers, and mixtures of at least one hydrophilic monomer and at least one hydrophobic monomer, to be present in the reaction mixture of stage (i). Specific representatives of monomers (a) are:

methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, alpha-methylstyrene, methyl acrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, styrene, functionalized methacrylates; acrylic acids and styrenes, selected from glycidyl methacrylate, 2-hydroxyethyl methacrylate, hydroxypropyl methacrylate (all isomers), hydroxybutyl methacrylate (all isomers), diethylaminoethyl methacrylate, triethylene glycol methacrylate, itaconic anhydride, itaconic acid, glycidyl acrylate, 2-hydroxyethyl acrylate, hydroxypropyl acrylate (all isomers), hydroxybutyl acrylate (all isomers), diethylaminoethyl acrylate, triethylene glycol acrylate, methacrylamide, N-tert-butylmethacrylamide, N-n-butylmethacrylamide, N-methylolmethacrylamide, N-ethylolmethacrylamide, N-tert-butylacrylamide, N-butylacrylamide, N-methylolacrylamide, N-ethylolacrylamide, vinylbenzoic acid (all isomers), diethylaminostyrene (all isomers), alpha-methylvinylbenzoic acid (all isomers), diethylamino-alpha-methylstyrene (all isomers), paramethylstyrene, p-vinylbenzenesulfonic acid, trimethylsilylpropyl methacrylate, triethoxysilylpropyl methacrylate, tributoxysilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilyl-propyl acrylate, dimethoxysilylpropyl acrylate, diethoxysilylpropyl acrylate, dibutoxysilylpropyl acrylate, diisopropoxysilylpropyl acrylate, vinyl acetate and vinyl butyrate, vinyl chloride, vinyl fluoride, vinyl bromide, and mixtures of the abovementioned monomers.

Preferably used as a first monomer (a') is acrylic or methacrylic acid, a $C_1$–$C_4$-alkyl or $C_1$–$C_4$-hydroxyalkyl acrylate or methacrylate, vinyl acetate, a substituted or unsubstituted vinylpyrrolidone, a mixture of two or more thereof, or a mixture of said first monomer (a') with at least one further free-radically homopolymerizable or copolymerizable monomer (a).

Also used in connection with the preparation of the reaction product (A) is a compound (I) of the formula

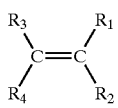

in which $R_1$ to $R_4$ each independently of one another are hydrogen, an unsubstituted or substituted alkyl radical, cycloalkyl radical or aralkyl radical or an unsubstituted or substituted aromatic hydrocarbon radical, the invention requiring at least two of $R_1$ to $R_4$ to be an unsubstituted or substituted aromatic hydrocarbon radical.

Here again it is possible in principle to use all compounds of the above formula in accordance with the invention. Preference is given as compound (I) to the use of diphenylethylene, dinaphthaleneethylene, 4,4-vinylidenebis(N,N'-dimethylaniline), 4,4-vinylidenebis(aminobenzene), cis- and trans-stilbene or a mixture of two or more thereof, further preference being given to using diphenylethylene. It is also possible to use substituted diphenylethylenes, which are substituted on either one or both aromatic hydrocarbon radicals with electron-withdrawing or electron-donating substituents, such as, for example, tert-butyl, benzyl or CN groups, or an alkoxydiphenyl-ethylene, such as, for example, methoxy-, ethoxy- or tert-butoxydiphenylethylene, or analogous thio or amine compounds.

In addition, the reaction product (A) is prepared by reaction in the presence of at least one free-radical initiator, preference being given here to oxidizing free-radical initiators. The initiator should preferably be soluble in water. In general, however, it is possible to use all azo and/or peroxo compounds which are conventionally used in free-radical chain polymerization. Suitable initiators are described in WO 98/01478 on p. 10, lines 17–34, which in this regard is incorporated in its entirety into the present specification. Preference is given to the use of oxidizing free-radical initiators, such as potassium, sodium and ammonium peroxodisulfates, for example, or to a combination of a conventional—i.e., non-oxidizing—initiator with $H_2O_2$.

In one preferred embodiment for the preparation of the reaction product a comparatively large amount of free-radical initiator is added, the free-radical initiator as a proportion of the reaction mixture being preferably from 0.5 to 50% by weight, more preferably from 1 to 20% by weight, based in each case on the overall amount of the monomer (a) and of the initiator. The ratio of initiator to compound (I) is preferably from 3:1 to 1:3, more preferably from 2:1 to 1:2, and in particular from 1.5:1 to 1:1.5.

The reaction described above in accordance with stage (i) is conducted in the to aqueous phase, in which case preference is given here to water or mixtures of water with water-miscible solvents, such as THF and ethanol, for example. It is, however, also possible to conduct the reaction in the presence of a mixture of water and a water-immiscible solvent, such as, for example, an aromatic solvent, such as toluene, for example.

In a further embodiment the above reaction according to stage (i) is conducted in the presence of at least one base. In this context, all low molecular mass bases can be used in principle, with preference being given to NaOH, KOH, ammonia, diethanolamine, triethanolamine, mono-, di- and triethylamine, dimethylethanolamine or a mixture of two or more thereof and particular preference to ammonia and di- and triethanolamine.

The temperature during the reaction in accordance with stage (i) is generally above room temperature and below the decomposition temperature of the monomers, the temperature range chosen being preferably from 50 to 150° C., more preferably from 70 to 120° C. and, in particular, from 80 to 110° C.

Although no restrictions whatsoever exist in respect of the molecular weight distribution, it is possible in the reaction according to (i) to obtain a reaction product which has a molecular weight distribution $M_w/M_n$, measured by gel permeation chromatography using polystyrene as standard, of $\leq 4$, preferably $\leq 3$, more preferably $\leq 2$, in particular $\leq 1.5$ and, in certain cases, $\leq 1.3$. The molecular weights of the reaction product (A) can be controlled within wide limits through the choice of the ratio of monomers (a) to compounds (I) to free-radical initiator. In this context the molecular weight is determined in particular by the amount of compound (I), specifically such that the greater the proportion of compound (I), the lower the resulting molecular weight.

The reaction in accordance with stage (i) can also be conducted in the presence of a surface-active substance.

The product of the reaction according to (i), which is generally obtained in the form of an aqueous mixture, can be further processed directly as a dispersion or else, preferably, be used as a macroinitiator for the subsequent reaction in accordance with stage (ii), as defined later on below. It is also possible to isolate the reaction product of stage (i) as a solid and then to react it further.

In the reaction in accordance with stage (ii) it is possible to react at least one freely selectable, free-radically homopolymerizable or copolymerizable monomer (b). This monomer (b) can be identical to or different than the monomer (a) used in stage (i). The selection of the monomer (b) is made in principle in accordance with the desired structure of the polymer prepared in stage (ii) and hence in dependence on the intended use of this polymer.

The following specific monomers preferred for use as monomers (b) may be mentioned:

monomers (b) are preferably selected from monoethylenically unsaturated $C_3$–$C_{10}$ monocarboxylic acids, their alkali metal salts and/or ammonium salts, examples being acrylic acid, methacrylic acid, dimethylacrylic acid, ethylacrylic acid, allylacetic acid and vinylacetic acid, and also monoethylenically unsaturated $C_4$–$C_8$ dicarboxylic acids, their monoesters, anhydrides, alkali metal salts and/or ammonium salts, examples being maleic acid, fumaric acid, itaconic acid, mesaconic acid, methylenemalonic acid, citraconic acid, maleic anhydride, itaconic anhydride and methylmalonic anhydride; and also monoethylenically unsaturated monomers containing sulfonic acid groups, examples being allylsulfonic acid, styrenesulfonic acid, 2-acrylamido-2-methylpropanesulfonic acid, methallylsulfonic acid, vinylsulfonic acid, 3-sulfopropyl acrylate and 3-sulfopropyl methacrylate, and also monoethylenically unsaturated monomers containing phosphonic acid groups, examples being vinylphosphonic acid, allylphosphonic acid and acrylamidoethylpropane-phosphonic acid, $C_1$–$C_{20}$-alkyl and hydroxyalkyl esters of monoethylenically unsaturated $C_3$–$C_{10}$ monocarboxylic acids or $C_4$–$C_8$ dicarboxylic acids, examples being methyl acrylate, ethyl acrylate, n-butyl acrylate, stearyl acrylate, diethyl maleate, hydroxyethyl acrylate, hydroxypropyl acrylate, hydroxybutyl acrylate, hydroxy-ethyl methacrylate and hydroxypropyl methacrylate, and also (meth)acrylic esters of alkoxylated $C_1$–$C_{18}$ alcohols that have been reacted with from 2 to 50 mol of ethylene oxide, propylene oxide, butylene oxide or mixtures thereof; and also amides and N-substituted amides of monoethylenically unsaturated $C_3$–$C_{10}$ mono-carboxylic acids or $C_4$–$C_8$ dicarboxylic acids, examples being acrylamide, N-alkylacrylamides and N,N-dialkyl-acrylamides having in each case 1 to 18 carbon atoms in the alkyl group, such as N-methylacrylamide, N,N-dimethylacrylamide, N-tert-butylacrylamide and N-octadecylacrylamide, N-methylhexylmaleamide, N-decyl-maleamide, diethylaminopropylmethacrylamide and acryl-amidoglycolic acid; and also alkylamidoalkyl (meth)-acrylates, examples being dimethylaminoethyl acrylate, dimethylaminoethyl methacrylate, ethylaminoethyl acrylate, diethylaminoethyl methacrylate, dimethylaminopropyl acrylate and dimethylaminopropyl methacrylate; and also vinyl esters, such as vinyl formate, vinyl acetate and vinyl propionate, which may also be in hydrolyzed form following the polymerization; and also N-vinyl compounds, examples being N-vinylpyrrolidone, N-vinylcaprolactam, N-vinylformamide, N-vinyl-N-methylformamide, 1-vinylimidazole and 1-vinyl-2-methylimidazole; and also vinyl ethers of $C_1$–$C_{18}$ alcohols, vinyl ethers of alkoxylated $C_1$–$C_{18}$ alcohols and vinyl ethers of polyalkylene oxides such as polyethylene oxide, polypropylene oxide or polybutylene oxide, styrene or its derivatives such as alpha-methylstyrene, indene and dicyclopentadiene;

monomers containing amino or imino groups, such as, for example, dimethylaminoethyl acrylate, diethylaminoethyl methacrylate, diethylaminopropyl-methacrylamide and allylamine, monomers which carry quaternary ammonium groups, in the form, for example, of salts, as obtained by reacting the basic amino functions with acids such as hydrochloric acid, sulfuric acid, nitric acid, formic acid or acetic acid, or in quaternized form (examples of suitable quaternizing agents being dimethyl sulfate, diethyl sulfate, methyl chloride, ethyl chloride and benzyl chloride), such as, for example, dimethylaminoethyl acrylate hydrochloride, diallyldimethylammonium chloride, dimethylaminoethyl acrylate methyl chloride, dimethylaminoethylaminopropylmethacrylamide methosulfate, vinylpyridinium salts and 1-vinylimidazolium salts; and monomers in which the amino groups and/or ammonium groups are liberated only after the polymerization and subsequent hydrolysis, such as, for example, N-vinylformamide and N-vinylacetamide.

The present invention accordingly also provides a coating composition which comprises in addition to at least one suitable additive (C) a polymer (B) obtainable by a process comprising:

(ii) reacting the reaction product (A) obtained in stage (i) under free-radical conditions in the presence of at least one free-radically homopolymerizable or copolymerizable monomer (b).

The reaction in accordance with stage (ii) is conducted in principle in accordance with the customary conditions for a free-radical polymerization, it being possible for appropriate solvents to be present.

Stages (i) and (ii) of the process of the invention can be conducted separately from one another both spatially and temporally, in which case, of course, stage (i) is conducted first and then stage (ii). In addition, however, stages (i) and (ii) can also be carried out in succession in one reactor; i.e., first of all the compound of the formula (I) is reacted partially or totally, as a function of the desired use and/or of the desired properties, with at least one monomer (a) and then at least one monomer (b) is added and free-radical polymerization is carried out, or else right from the beginning a monomer mixture comprising at least one monomer (a) and at least one monomer (b) is used and is reacted with the compound (I). In this context it is assumed that the compound (I) is first of all reacted with said at least one monomer (a) and then the reaction product (A) formed therefrom also reacts, above a certain molecular weight, with the monomer (b).

Depending on reaction regime it is possible in accordance with the invention in this case to prepare endgroup-functionalized polymers, block or multiblock and gradient (co)polymers, star polymers, graft copolymers and branched (co)polymers as coating composition components.

Furthermore, the present invention also provides a coating composition comprising an aqueous mixture comprising the reaction product (A) or the polymer (B) or a combination of two or more thereof.

The reaction product (A) and/or the polymer (B) or a mixture of two or more thereof can be used in accordance with the utility as coating composition component in a form suitable for that purpose, especially as polymer dispersions.

In accordance with their field of use, the-coating compositions of the invention include suitable additives (C) such as polymers, especially crosslinkers, crosslinking catalysts, initiators, especially pigments, dyes, fillers, reinforcing fillers, rheological assistants, wetting and dispersing agents, defoamers, adhesion promoters, additives for improving the substrate wetting, additives for improving the surface smoothness, flatting agents, leveling agents, film-forming auxiliaries, siccatives, antiskinning agents, light stabilizers, corrosion inhibitors, biocides, flame retardants, polymerization inhibitors, especially photoinhibitors, or plasticizers, as are known and conventional, for example, in the plastics or coatings sectors. The selection of the additives is guided by the desired profile of properties of the coating composition and by its intended use.

The coating compositions of the invention can be applied using the known methods of application of liquid phases, such as dipping, spraying, knife coating, brushing, roller coating or curtain coating. Examples of suitable substrates are films, foils, fibers, sheet metal, woven fabrics or moldings, especially automotive bodywork components, made of metal, glass, wood, paper, plastic, leather, mineral substrates or composite materials. At the time of application, these substrates may be in a state of rest or of mobility, such as in the case of the coil coating technique, for instance.

Thus, the present invention also relates to a process for coating substates, which comprises using a composition as defined herein.

In addition, the coating compositions of the invention can be employed in powder form, especially in the case of powder coating.

In particular, the coating compositions of the invention can be constituents of multicoat coating systems, as are encountered, for example, in automotive OEM finishing, automotive refinishing, the coating of plastics, industrial coating, container coating, the coil coating technique, or furniture coating.

The intention of the text below is to illustrate the present invention with reference to a number of examples.

EXAMPLE 1

A reaction vessel was charged with 52.56 g of deionized water and this initial charge was heated to 90° C. Subsequently, at a constant temperature of 90° C., three separate feedstreams were metered in at a uniform rate in parallel. Feedstream 1 consisted of 10.18 g of acrylic acid, 18.35 g of methyl methacrylate and 1.49 g of diphenylethylene. As feedstream 2, 9.9 g of a 25% strength by weight ammonia solution were added. Feedstream 3 consisted of a solution of 2.25 g of ammonium peroxodisulfate in 5.25 g of deionized water. Feedstreams I and II were metered in over the course of 1 hour, feedstream III over the course of 1.25 hours. When addition was at an end, a 4-hour postpolymerization phase ensued, with cooling. The resulting micellar solution had a solids content of 33% by weight.

EXAMPLE 2

First of all, 9.1 g of the product prepared in Example 1 were initially introduced in 51.62 g of deionized water and this initial charge was heated to 90° C. with stirring in a reactor. Subsequently, a feedstream consisting of 9.86 g of n-butyl methacrylate, 7.88 g of styrene, 12.66 g of hydroxyethyl methacrylate and 8.88 g of methyl methacrylate was metered in over the course of 6 hours with thorough stirring. The resulting dispersion had a solids content of about 40% by weight.

EXAMPLE 3

First of all, 9.1 g of the product prepared in Example 1 were initially introduced in 51.62 g of deionized water and this initial charge was heated to 90° C. with stirring in a reactor. Subsequently, a feedstrean consisting of 9.86 g of n-butyl methacrylate, 7.88 g of styrene, 12.66 g of hydroxypropyl methacrylate and 8.88 g of ethylhexyl methacrylate was metered in over the course of 6 hours with thorough stirring. The resulting dispersion had a solids content of about 40% by weight.

EXAMPLE 4

First of all, 9.1 g of the product prepared in Example 1 were initially introduced in 51.62 g of deionized water and this initial charge was heated to 90° C. with stirring in a reactor. Subsequently, a feedstream consisting of 9.86 g of n-butyl methacrylate, 7.88 g of vinyl acetate, 12.66 g of hydroxyethyl methacrylate and 8.88 g of 2-ethylhexyl methacrylate was metered in over the course of 6 hours with thorough stirring. The resulting dispersion had a solids content of about 40% by weight.

EXAMPLE 5

First of all, 9.1 g of the product prepared in Example 1 were initially introduced in 51.62 g of deionized water and this initial charge was heated to 90° C. with stirring in a reactor. Subsequently, a feedstream consisting of 9.86 g of n-butyl methacrylate, 7.88 g of styrene, 3.94 g of isobutoxymethyl methacrylate, 8.72 g of hydroxyethyl methacrylate and 8.88 g of ethylhexyl methacrylate was metered in over the course of 6 hours with thorough stirring. The resulting dispersion had a solids content of about 40% by weight.

EXAMPLE 6

A 5 kg steel reactor was charged with 528.7 g of deionized water and this initial charge was heated to 90° C. Subsequently, at a constant temperature of 90° C., three separate feedstreams were metered in at a uniform rate in parallel over the course of 4 hours. Feedstream I consisted of 106.2 g of MA-13, 378.1 g n-butyl methacrylate, 159.3 g of styrene, 54.5 g of acrylic acid, 332.4 g of methyl methacrylate and 31.9 g of diphenylethylene. Feedstream II was a solution of 42.5 g of ammonium peroxodisulfate in 170 g of deionized water. Feedstream III contained 51.61 g of dimethylethanolamine. When addition was at an end, a 2-hour postpolymerization phase ensued at 90° C. Cooling gave a white dispersion which had a pH of 5.5, a solids content (60 minutes, 130° C.) of 41%, an alcoholically determined acid number of 58 mg of KOH/g of solids and a viscosity of 0.9 dPas (23° C., cone/plate). The molecular weight was determined by means of GPC against polystyrene as standard and was $M_n$ 4406 g/mol, $M_w$ 8603 g/mol, polydispersity 1.95.

MA-13: methacrylic acid ester 3.0 Röhm

EXAMPLE 7

The dispersions obtained in accordance with Examples 1 to 6 are applied in a dry film thickness of from about 50 to 100 μm to glass plates using a coating bar and are dried at temperature between RT and 130° C. In all cases, transparent, highly glossy, smooth films are obtained. The films of Examples 2 to 5 also exhibit a high level of water resistance.

We claim:

1. A coating composition comprising at least one product (A) and at least one suitable additive (C), (A) being obtainable by a process comprising the following stage (i):

(i) reacting under free-radical conditions a reaction mixture comprising at least one free-radically reactable monomer (a) in the presence of at least one free-radical initiator and of a compound (I) of the formula

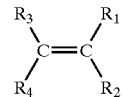

in which $R_1$ to $R_4$ each independently of one another are hydrogen, a substituted or unsubstituted alkyl radical, cycloalkyl radical or aralkyl radical, or an unsubstituted or a substituted aromatic hydrocarbon radical, with the proviso that at least two of $R_1$ to $R_4$ are an unsubstituted or a substituted aromatic hydrocarbon radical in aqueous phase.

2. A composition as claimed in claim 1, wherein the reaction (k) is conducted in the presence of at least one base.

3. A composition as claimed in claim 1, wherein said free-radical initiator is an oxidizing free-radical initiator.

4. A composition as claimed in claim 1, wherein the proportion of free-radical initiator to said at least one monomer (a) is from 0.5 to 50% by weight, based on the overall amount of the initiator and of the monomer (a).

5. A composition as claimed in claim 1, wherein said compound (I) is diphenylethylene, an alkoxydiphenylethylene, dinaphthaleneethylene, 4,40-vinylidenebis(N,N- dimethylaniline), 4,4-vinylidenebis(1-aminobenzene), cis- or trans-stilbene or a mixture of two or more thereof.

6. A composition as claimed in claim 2, wherein said compound (I) is diphenylethylene, an alkoxydiphenylethylene, dinaphthaleneethylene, 4,4-vinylidenebis(N,N-dimethylaniline), 4,4-vinylidenebis(1-aminobenzene), cis- or trans-stilbene or a mixture of two or more thereof.

7. A composition as claimed in claim 1, wherein said monomer (a) is a hydrophilic monomer, a mixture comprising at least two hydrophilic monomers or a mixture comprising at least one hydrophilic and at least one hydrophobic monomer.

8. A composition as claimed in claim 1, wherein the reaction mixture comprises as a first monomer (a) acrylic or methacrylic acid, a $C_1$–$C_4$-alkyl or $C_1$–$C_4$-hydroxyalkyl acrylate or methacrylate, vinyl acetate, a substituted or unsubstituted vinylpyrrolidone, a mixture of two or more thereof, or a mixture of said first monomer (a) with at least one further free-radically homopolymerizable or copolymerizable monomer.

9. A composition as claimed in claim 2, wherein said base is selected from the group consisting of NaOH, KOH, ammonia, diethanolamine, triethanolamine, mono-, di- or triethylamine, dimethylanolamine or a mixture of two or more thereof.

10. A coating composition comprising a reaction product (A) as set forth in claim 1, at least one suitable additive (C) and at least one polymer (B) obtained by (ii) reacting the reaction product (A) obtained in stage (i) under free-radical conditions in the presence of at least one free-radically homopolymerizable or copolymerizable monomer (b).

11. A coating composition comprising a reaction product (A) as set forth in claim 15, at least one suitable additive (C) and at least one polymer (B) obtainable by (ii) reacting the reaction product (A) obtained in stage (i) under free radical conditions in the presence of at least one free-radically homopolymerizable or copolymerizable monomer (b).

12. A composition as claimed in claim 1, comprising the reaction product (A) and the polymer (B) as a dispersion.

13. A composition as claimed in claim 1, comprising the reaction product (A) or the polymer (B) as a dispersion.

14. A composition as claimed in claim 10, comprising the reaction product (A) and the polymer (B) as a dispersion.

15. A composition as claimed in claim 10, comprising the reaction product (A) or the polymer (B) as a dispersion.

16. A process for coating substrates, which comprises using a composition as claimed in claim 1.

17. A process for coating substrates, which comprises using a composition as claimed in claim 10.

18. A process as claimed in claim 16, wherein said composition is a constituent of a multicoat system.

19. A process as claimed in claim 17, wherein said composition is a constituent of a multicoat system.

20. A process as claimed in claim 16, wherein the composition comprises crosslinkable constituents.

* * * * *

UNITED STATES PATENT AND TRADEMARK OFFICE
CERTIFICATE OF CORRECTION

PATENT NO.    : 6,716,905 B1
DATED         : April 6, 2004
INVENTOR(S)   : Bremser et al.

It is certified that error appears in the above-identified patent and that said Letters Patent is hereby corrected as shown below:

Column 8,
Line 67, "4,40-vinylidenebis" should be -- 4,4-vinylidenebis --.

Column 10,
Line 4, "claim 15" should be -- claim 2 --.

Signed and Sealed this

Eleventh Day of January, 2005

JON W. DUDAS
*Director of the United States Patent and Trademark Office*